United States Patent [19]

Goldstein

[11] Patent Number: 4,495,041
[45] Date of Patent: Jan. 22, 1985

[54] PHOTOCHEMICAL PROCESS USING SHAPE-SELECTIVE PHOTOASSISTED HETEROGENOUS CATALYST COMPOSITIONS

[75] Inventor: Theodore P. Goldstein, Yardley, Pa.

[73] Assignee: Mobil Oil Corporation, New York, N.Y.

[21] Appl. No.: 368,550

[22] Filed: Apr. 15, 1982

[51] Int. Cl.$^3$ .............................................. B01J 19/12
[52] U.S. Cl. ............................ 204/158 R; 204/162 R
[58] Field of Search ........... 204/158 R, 162 R, 158 N, 204/159.23, 163 R; 502/62, 73

[56] References Cited

U.S. PATENT DOCUMENTS

| | | | |
|---|---|---|---|
| 3,002,911 | 10/1961 | Sutherland et al. | 204/158 HE |
| 3,574,076 | 4/1971 | Kirsch | 204/162 R |
| 3,702,886 | 11/1972 | Argauer et al. | 423/328 T |
| 4,298,439 | 11/1981 | Gafney | 204/158 R |
| 4,303,486 | 12/1981 | Bard et al. | 204/162 R |

FOREIGN PATENT DOCUMENTS 658122  4/1979  U.S.S.R. .............................. 570/254

OTHER PUBLICATIONS

Vasili et al, "An Investigation of the Stability of a Zeolite-Bearing Catalyst in the Hexene-I Transformation Process Under the Action of Ultraviolet Rays", copyright, All-union Scientific Research Institute for Petroleum Technology, 1980.
S. L. Suib et al., Photochemical Studies of Zeolites, Inorganic Reactions in Organic Media, 1981.
G. T. Pott et al., Transition Metal Ion Photoluminescence as a Technique for the Study of Structures of Oxidic Catalysts, Cat. Rev. Sci. Eng., 12(2), 163–199, (1975).

*Primary Examiner*—Howard S. Williams
*Attorney, Agent, or Firm*—A. J. McKillop; M. G. Gilman; L. P. Hobbes

[57] ABSTRACT

Highly specific catalyst compositions are provided, comprising zeolites containing a photoassisting material, which is capable of catalyzing photoassisted heterogenous catalytic reactions within the zeolite structure. The photoassisting material can be sorbed by the zeolite or incorporated directly within the zeolitic framework.

22 Claims, No Drawings

PHOTOCHEMICAL PROCESS USING SHAPE-SELECTIVE PHOTOASSISTED HETEROGENOUS CATALYST COMPOSITIONS

BACKGROUND OF THE INVENTION

1. Field of the Invention

This invention relates to catalyst compositions. In particular, it relates to shape-selective photoassisted heterogenous catalyst compositions which comprise a zeolite having a photoassisting species such as a photocatalytic, photoactive, or photosensitive material, within the zeolite structure.

2. Background Art

Large-scale industrial reactions are generally promoted by means of a catalyst or by the addition of energy in the form of heat to the reaction. One form of energy that has recently come into commercial chemical synthesis is radiant or light energy. Addition of radiant energy to a reaction can produce electronically excited molecules which are labile and therefore capable of undergoing chemical reactions.

Organic molecules which have all their electrons in stable orbitals are in the ground electronic state. Such orbitals may be bonding or non-bonding. If a photon of sufficient energy collides with the molecule, and is absorbed, one of the electrons is promoted to an unoccupied antibonding molecular orbital at a higher energy level.

Such excitation of an electron causes a redistribution of valence electrons resulting in internuclear configuration changes. Consequently, an electronically excited molecule can undergo chemical reactions that are quite different from a corresponding ground state molecule.

A photon's energy is defined in terms of its frequency or wavelength, $$E = h\nu = hc/\lambda$$

where E is energy; h is Planck's constant, $6.6 \times 10^{-27}$ erg-sec; $\nu$ is the frequency of the radiation, $sec^{-1}$; C is the speed of light; and $\lambda$ is the wavelength of the radiation. Upon absorption, the absorbing species receives all of the energy of the absorbed proton. The effects of absorption on the absorbing species usually depend on the wavelength of the incident radiation. Radiation chemistry involves energetic photons, usually of wavelength less than 1000 A which result in ionization of the absorbing species. Photochemistry relates to photons whose energies lies in the ultraviolet region (1000–4000 A) and in the visible region (4000–7000 A) of the electromagnetic spectrum. The absorption of such a proton causes a molecule to become electronically excited. Radiation resulting from longer-wavelength photons is known as heat. Such radiation primarily excites vibrational modes in a molecule.

The present invention relates to chemical reactions involving photons of ultraviolet or visible wavelength. Where such absorbed energy is released as chemical energy, fragmentation, free-radical formation, isomerization, and addition reactions may take place in the photochemical system. Unlike thermal reactions which occur between any molecules whose total energies are above some minimum level, the degree of excitation of reactants may be precisely controlled in photochemical reactions. Since the molecules are imbued with additional electronic energy upon absorption of light, reactions can occur along completely different potential energy surfaces from those encountered in thermally excited systems. Greater amounts of light energy may be absorbed by a molecule than is possible thermally, since thermal excitation often involves other competing processes, such as bond rupture, which occur before the desired energy state can be reached. Consequently, unique, thermodynamically unstable, structurally strained molecules may often be formed photochemically, but not thermally. Similarly, photolytic decomposition can occur at low temperatures, resulting in large concentrations of reactive intermediates which may be trapped and studied with conventional techniques.

A general characteristic of radiant energy absorption is the capability of acting directly upon specific molecules in the system, rather than adding energy to the system as a whole. Such specificity allows the system as a whole to remain at a relatively low temperature, since only the reactants need be activated. This furthermore permits the use of solvents which could not be used in a thermal reaction.

Although the foregoing photochemical reaction systems are capable of selectively reacting specific components in the reaction medium, it is difficult to insure that the electronically excited reactants form the exact products which are desired. For example, hydrocarbons which are electronically excited by ultraviolet radiation may form both branched and straight-chain products. This production of unwanted by-products reduces the overall yield of the desired product. Furthermore, if only straight-chain molecules are desired, they must ordinarily be separated from the product mixture, a time-consuming and costly process. A shape-selective catalyst composition which contains a photoassisting species, i.e., a species which enhances catalytic activity upon exposure to ultraviolet or visible radiation, by its very nature, will selectively photocatalyze only those molecules within a mixture of potential reactants, having the "proper" shape. Thus, such a photoassisted heterogenous catalyst composition is selective for reactants as well as reaction products. Consequently, it is apparent that a photoassisted heterogenous catalyst composition which is also shape-selective would be of great value in the reaction of and production of certain molecules.

SUMMARY OF THE INVENTION

Accordingly, it has now been found that a highly specific photoassisted heterogenous catalyst composition can be made by incorporating a photoassisting material within the framework of a zeolite catalyst. Since zeolites and related silica and aluminosilicate materials are transparent to much of the radiant energy in the ultraviolet and visible regions of the electromagnetic spectrum, radiation-induced reactions can occur within the interior of these materials.

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:3. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may often be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are usually occupied by molecules of water prior to dehydration.

Prior art techniques have resulted in the formation of a great variety of synthetic aluminosilicates. The aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZSM-5 (U.S. Pat. No. 3,247,195), zeolite ZK-4 (U.S. Pat. No. 3,314,752) zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-21 and 38 (U.S. Pat. No. 4,046,859), and zeolite ZSM-23 (U.S. Pat. No. 4,076,842), merely to name a few.

The $SiO_2/Al_2O_3$ ratio of a given zeolite can vary considerably. For example, zeolite X can be synthesized with $SiO_2/Al_2O_3$ ratios of from 2 to 3; zeolite Y, from 3 to about 6. In some zeolites, the upper limit of $SiO_2/Al_2O_3$ ratio is unbounded. ZSM-5 is one such example wherein the $SiO_2/Al_2O_3$ ratio is at least 5, up to infinity. U.S. Pat. No. 3,941,871, now U.S. Pat. No. Re. 29,948, discloses a porous crystalline silicate made from a reaction mixture containing no deliberately added alumina in the recipe and exhibiting an X-ray diffraction pattern characteristic of ZSM-5 type zeolites. U.S. Pat. Nos. 4,061,724, 4,073,865 and 4,104,294 describe crystalline silicates or organosilicates of varying alumina and metal content.

An important characteristic of the crystal structure of these zeolites is that they can provide constrained access to, and egress from the intracrystalline free space by virtue of their having a set pore dimension and pore windows which are provided by rings of oxygen atoms within the zeolite structure. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra.

The sizes of these pore windows can vary between different zeolites. For example, "Zeolite 4A" has a pore diameter of about 4 Angstroms while that of Zeolite 13X is about 10 Angstroms. Zeolites are known in which the pore diameter may have a size in the range of about 3 to 15 Angstroms.

Typical crystalline aluminosilicate zeolites include, among others, the synthetic zeolites described in the following references:

| Zeolite | U.S. Pat. No. |
| --- | --- |
| A | 2,882,243 |
| B | 3,008,803 |
| E | 2,962,355 |
| F | 2,996,358 |
| H | 3,010,789 |
| J | 3,011,869 |
| L | 3,130,006 |
| M | 2,995,423 |
| Q | 2,991,151 |
| T | 2,950,952 |
| U | 3,248,170 |
| W | 3,012,853 |
| X | 2,882,244 |
| Y | 3,130,007 |
| Z | 2,972,516 |
| XJ4 | 3,140,252 |
| ZK5 | 3,247,195 |
| ZSM-5 | Re 29,948 |
| ZSM-11 | 3,709,979 |
| ZSM-5/ZSM-11 Intermediates | 4,229,424 |
| ZSM-23 | 4,076,842 |
| ZSM-35 | 4,016,245 |
| ZSM-38 | 4,046,859 |
| ZSM-48 | Ser. No. 303,276 |

Also suitable for the invention besides the foregoing, are modifications thereof; for example, type X, or any other type, exchanged by a rare earth metal, or by any other exchangeable metal. Natural zeolites are suitable, including levynite, dachiarite, erionite, faujasite, analcite, paulingite, nomelite, phillipsite, brewsterite, flakite, datolite, chabazite, gmelinite, leucite, acapolite, mordenite, etc.

Briefly, the preferred type zeolites useful in this invention possess a structure providing constrained access to the crystalline free space. Thus, zeolitic materials incorporating photoassisting or photoactive species will photocatalyze only those reactants within the interior of the zeolitic materials. Reactants in the irradiated bulk phase of the reaction system will remain unaffected. As a result of this characteristic, it is possible to construct highly specific reaction systems based on the shape or sorption selectivity of the zeolites, reactants, or reaction products.

The photoassisting species used in the present invention possess electrons which can be excited by radiant energy and transmitted to a photosensitizer or photosensitive reactant. These species may be introduced into the interstitial voids of the zeolite or incorporated directly within the zeolite framework. Generally, photoassisting species comprise less than about one percent by weight of the resulting composite. Photoassisting free metals and organic dye sensitizers are generally incorporated into the zeolitic voids while photoassisting metal ions and certain ionizable photoassisting organic dyes and/or sensitizers can be incorporated into the zeolitic framework itself.

Photoassisting metal may be introduced to the zeolite in a number of ways, including melting or vaporizing the metal in the presence of the zeolite so that as water of hydration is removed, the fluid metal can flow into the channels so formed; or introducing a reducible organometallic compound, such as organo tin, mercury alkyls, and the like, into the channels, instead of fluid metal, and reducing such compound to elemental metal in situ; or base exchanging the metal into the zeolite, followed by reduction of the same to elemental metal. Also, a metal like mercury can be precipitated in nucleation sites, such as silver cations.

A preferred method is that first described, comprising melting the metal in the presence of the zeolite. According to that technique, a mixture is made by grinding the zeolite and metal together to provide an intimately mixed mass and thus favoring subsequent entry of the metal into the interstitial voids of the zeolite. Conventional equipment is suitable for grinding. The ground mixture is then subjected to a suitable vacuum, say 0.1 mm. or less, and at the same time is heated for a time sufficient to dehydrate the zeolite. The preferred metal for this method is one that melts during the heating, so that, as the water is driven out of the zeolite, the molten metal enters the interstitial channels so formed, i.e., is sorbed or occluded by them. Generally, heating may be continued for up to 10 or 20 hours, or more. Temperatures of up to about 350° C. are suitable, or up to 475° C., or even up to 650°–700° C. The decomposition temperature of the zeolite, which is generally in the range of 700°–800° C., should not, of course, be exceeded. Suitable metals useful in this method include indium, mercury, tin, cadmium, bismuth and thallium, particularly cadmium and mercury, all of which melt below about 350° C. Useful higher melting metals include tellurium (MP about 452° C.) and antimony (MP about 630° C.). Alloys of appropriate melting points are useful. The heating step may be discontinued when no more water is evolved as steam. Thereafter, the mixture may be allowed to cool. It generally contains at least 0.001 percent, preferably about 1 percent, by weight of metal. By means of a trial run or two, or by calculating, one can initially take the correct amount of metal so that no excess is present at the end of the heating step. The cooled mixture comprises the photocatalytic composition.

When a method is used in which the metal is vaporized in the presence of the zeolite, the step is preferably carried out at reduced pressures, and the metal chosen should have as high a vapor pressure as possible. Mercury is an example of a suitable metal for this method.

Organic dye sensitizers are also suitable for introduction within a zeolite. Organic dye molecules which fit within the zeolite pores may be directly incorporated within the zeolite by conventional adsorption techniques. Those dye molecules which are too bulky to pass through the pores but which fit within the cavities of the zeolite can be synthesized in situ provided the reactants can pass through the pores to the cavities. Dye molecules incorporated within the zeolite by this method are naturally more likely to remain within the zeolite cavities even under severe conditions. Suitable organic dye sensitizers include such compounds as: crystal violet, sodium-9, 10-anthraquinone-2-sulfuric acid, anthraquinone derivatives such as C.I. acid red 12, d, l, mandelic acid, acridine dyes, polymethine dyes such as astrazone orange G and astrazone pink FG, xanthene dyes such as erythrosine B and rosolic acid. See e.g., E. Gurr, Synthetic Dyes in Biology, Medicine and Chemistry, Academic Press, N.Y. 1971; H. Meier, Spectral Sensitization, Focal Press, New York, 1968; W. F. Berg, U. Mazzucato, H. Meier, and G. Semerano (Eds.), Dye Sensitization, Focal Press, New York, 1970.

The photoassisting metal ions can be introduced within zeolite-type framework by conventional base-exchange methods. Generally, such methods comprise contacting a zeolite catalyst with an aqueous solution of salts containing the photoassisting metal ion. In general, the metal salts may be in the form of metal chlorides, sulfates, nitrates and other water-soluble compounds of these metal ions. Such methods are set out in detail in Breck, Zeolite Molecular Sieves, John Wiley and Sons, New York, 1974, Chapter 7, incorporated herein by reference.

The photoassisting metal ions contained in the catalyst material of the present invention can include metals of the fifth and sixth periods of the periodic table, e.g., $Tl^{III}$, $Ce^{III}$ and $Ce^{IV}$. The former two are particularly useful in photoassisted heterogenous catalytic decarboxylation processes. Metal ions incorporated within the zeolitic framework are generally preferred over sorbed metals such as mercury. At ambient temperatures, mercury tends to leak outside the zeolitic pores, resulting in contamination of the reaction medium, and a concomitant reduction in the activity and specificity of the catalyst. In contrast, the metallic ions which are part of the structural framework of the zeolite can withstand much more vigorous conditions without ill effect.

The type of photoassisting metal utilized in a photoassisted heterogenous catalytic reaction can affect the ultimate product yield. For example, when propane is exposed to mercury metal in the presence of ultraviolet light, the resulting products are primarily six carbon hydrocarbons. However, when cadmium metal is substituted for mercury in the same reaction, a mixture of $C_4$, $C_5$, $C_6$, and $C_7$ hydrocarbons is obtained. By varying the kinds of metals used as photoassisting species, it is possible to qualitatively change the product mixture of the reaction. For example, when propane is exposed to mercury metal in the presence of ultraviolet light, the resulting products are primarily $C_6$ hydrocarbons. However, when cadmium is substituted for mercury in the same reaction, a mixture of $C_4$, $C_5$, and $C_7$ hydrocarbons are produced in addition to the six carbon hydrocarbons.

The photoassisted heterogenous catalytic compositions of the invention may be used in various ways, for example, reactions can occur in either the gas or liquid phase. Generally, the compositions are exposed to radiant energy, preferably ultraviolet or visible light, and simultaneously contacted with reactants. The products of the reaction can then be removed from the reaction system. The wavelength of ultraviolet radiation can range from about 1800 Å to about 4000 Å depending on a system's reactants and desired products. The reaction system can utilize branched, cyclic or straight chain hydrocarbons as reactants, containing anywhere from about 1 to 50 carbon atoms. For example, when propane is introduced to a reaction system exposed to ultraviolet light, which system contains a photoassisted heterogenous catalyst composition of Zeolite 13X, sorbed with the free metal mercury, the resulting products include addition products such as 2,3-dimethylhexane and 2-methylpropane. When Zeolite 5A is substituted for Zeolite 13A, no branched chain zeolites are collected unless the zeolite structure is broken apart. Branched chain as well as cyclic hydrocarbons are then detected, indicating that the reaction occurs within the zeolite.

The photoassisted heterogenous catalyst compositions are also useful in reactions involving the decarboxylation of organic acids. The compounds decarboxylated may be aliphatic, aromatic, or heteroatomic organic acids. For example, valeric acid is decarboxylated to form products such as n-butane, i-butene, n-octane and n-pentane when a photoassisted heterogenous catalyst composition of Zeolite 13X, containing an exchanged photoassisting metal ion, is irradiated with ultraviolet light of about 2537 A. Suitable metal ions for incorporation within a zeolitic framwork used in decarboxylation include $Tl^{III}$, and $Ce^{III}$. When a mixture of normal and iso-fatty acids is irradiated in the presence of a catalyst composition of the present invention which has a structure which excludes or poorly sorbs branched chain fatty acids, only those carboxylic acids capable of entering the internal structure of the composition will undergo photochemical reactions.

The foregoing decarboxylation methods can be modified by introducing an oxidizing agent such as oxygen to the reaction system. The oxidant may be introduced as a gas, or dissolved within a reactant or generated in-situ, depending upon the oxidant and reaction system involved. The addition of an oxidant enhances the photochemical decarboxylation by maintaining the incorporated metal ions in a higher, and thus more favorable, oxidation state.

In order to more fully illustrate the nature of the invention and the manner of practicing it, the following examples are presented.

EXAMPLE 1

A shallow bed of 13X zeolite, containing less than 1 weight percent sorbed mercury, was positioned in the center portion of a horizontal quartz reaction tube. The reaction tube was fitted with a gas metering device, cold traps, and gas sampling ports both upstream and downstream from the catalyst bed. Prior to use, the system was flushed with dry nitrogen gas for periods ranging from 15 minutes to overnight. After nitrogen flushing, propane, at a rate of 5 to 20 ml/min, was introduced into the system at ambient temperature (18°–35° C.). In the unirradiated system, propane was the only gas phase material detected by gas liquid chromatography (GLC) either exiting from the system, or upstream or downstream from the catalyst bed. A similar result was observed if the upstream or downstream portion of the reactor tube, but not the catalyst bed, was irradiated with an ultraviolet light, e.g. that provided by a Hanovia Sc 2537 high voltage mercury lamp. Upon irradiation of the catalyst bed, the downstream or exit gases were found to contain about 3 weight percent 2,3-dimethylhexane and 2-methylpentane in a ratio of about 7:1, in addition to propane. The upstream gas contained only propane. This reaction, which occurs within the zeolite structure, is believed to proceed by a mercury photosensitized pathway, in which mercury ($Hg^0$) is excited to the active state ($Hg(^3P_1)$) by irradiation with ultraviolet light. The reaction did not occur when mercury-free 13X zeolite was used in the system described above.

EXAMPLE 2

A sample of 5A zeolite, containing sorbed mercury was placed in the system described for Example 1. With propane passing through the system, ultraviolet irradiation either upstream or downstream from the catalyst had little effect on the gas phase composition. Irradiation of the catalyst bed resulted in a slight increase of hexane isomers downstream from the irradiated zone.

After a period of 3 hours irradiation with a Hanovia lamp in a stream of propane (3–5 ml/min), the 5A zeolite was removed from the reaction system, wet with water, and placed in an apparatus designed to trap gases under water. The 5A zeolite structure was destroyed by addition of HF/HCl to the apparatus and the gases released from the zeolite structure analyzed. The GLC analysis of the gases indicated that in addition to 2,3-dimethylbutane and 3-methylpentane, other $C_6$ isomers (e.g. methylcyclohexane) may have been released from the zeolite. Since branched chain hydrocarbons cannot pass through the 5A zeolite ports, the finding of iso structures inside the zeolite demonstrates the operation of the photosensitized reaction within the zeolite structure. Furthermore, since only unbranched hydrocarbons can find their way into the zeolite, this example represents a shape selective photoassisted heterogenous catalytic reaction.

EXAMPLE 3

The procedure of Example 1 where the reactant may be either a branched, cyclic, or straight chain hydrocarbon, with carbon number from about 1–50. The reaction can occur in either the gas or liquid phase. The products of these reactions include compounds of both higher and lower molecular weights than the reactants, of the type that would be expected from free radical processes. The kinds of chemical processes that can occur in these reactions include:

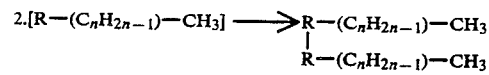

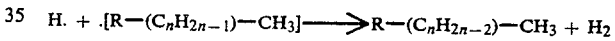

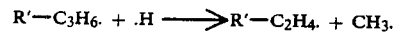

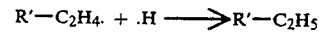

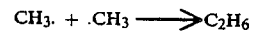

EXAMPLE 4

The procedure of Example 1, 2, or 3 is repeated except that the zeolite contains cadmium inside the zeolite structure at levels of less than about 1 weight percent when propane is used as the reactant. The main products are hexanes, some hydrogen, with smaller amounts of methane, butane, pentanes, and heptanes. When cadmium is used as the photoassisting metal ion, under the same conditions, more C—C bond splitting occurs than is the case when mercury is used for this purpose.

EXAMPLE 5

A sample of 13X zeolite, containing thallium$^{III}$ as an exchanged cation is used as a photocatalyst in the liquid phase decarboxylation of organic acids. A 1M solution of valeric acid in benzene at 30° C. is stable when irradiated with ultra violet light at 2537 A. When the thallium-containing zeolite is added to this system, the acid undergoes decarboxylation to give, among other components, n-butane, i-butene, n-pentane.

EXAMPLE 6

The procedure of Example 4 and 5 where the organic acid can be aliphatic, aromatic, or heteroatomic.

EXAMPLE 7

The procedures of Examples 1, 2, 3, 5 or 6 where the zeolite contains $Ce^{III}$.

EXAMPLE 8

A mixture of normal- and iso-fatty acids (in a hydrocarbon solvent) are irradiated with a $Tl^{+3}$-containing zeolite of a structure such that iso-fatty acids are excluded or poorly sorbed. The carboxylic acids capable of entering the zeolite internal structure will undergo photoassisted reactions while the excluded acids will not.

EXAMPLE 9

The procedure of Example 8 where the zeolite contains $Ce^{+4}$ and/or $Ce^{+3}$.

EXAMPLE 10

The procedure of Examples 5–9, except that oxygen is introduced into the system either in the gas phase, by dissolution, or by in-situ generation in order to maintain the photoassisting species in a favorable oxidation state.

What is claimed is:

1. A method of catalyzing highly specific photochemical reactions in a reaction system by incorporating a photoassisting species within a zeolite catalyst to form a catalyst composition, which method comprises:
   exposing the catalyst composition to radiant energy selected from the group consisting of ultraviolet radiation and visible light while simultaneously contacting the catalyst composition with one or more reactants, and removing the resulting products from the reaction system.

2. The method of claim 1 wherein the photoassisting species is selected from the group consisting of metals, metal ions, or organic dye sensitizers.

3. The method of claim 1 or 2 wherein the photoassisting species comprises less than about one percent by weight of the catalyst composition.

4. The method of claim 1 wherein the catalyst composition includes a zeolite selected from the group consisting of zeolites A, B, E, F, H, J, L, M, Q, T, U, W, X, Y, Z, ZK4, ZK5, 4A and 13X.

5. The method of claim 1 wherein the catalyst composition includes a zeolite selected from the group consisting of zeolites ZSM-5, ZSM-11, ZSM-5/ZSM-11 Intermediates, ZSM-23, ZSM-35, ZSM-38 and ZSM-48.

6. The method of claim 1 wherein the catalyst composition includes a ZSM-5 zeolite.

7. The method of claim 1 wherein the radiant energy is ultraviolet radiation.

8. The method of claim 7 wherein the wavelength of the ultraviolet radiation is between about 1800 A and 4000 A.

9. The method of claim 1 wherein the radiant energy is visible light.

10. The method of claim 1 wherein the reactants are selected from the group of branched, cyclic, straight chain hydrocarbons, containing 1 to 50 carbon atoms.

11. The method of claim 1 wherein the reactants comprise those selected from the group consisting of organic acids.

12. The method of claim 11 wherein the organic acid undergoes decarboxylation.

13. The method of claim 12 wherein the photoassisting species includes a metallic ion.

14. The method of claim 13 wherein the metallic ion is selected from the group consisting of $Tl^{+3}$, $Ce^{+3}$ and $Ce^{+4}$.

15. The method of claim 12 wherein the reactants comprise those selected from the group consisting of aliphatic, aromatic and heteroatomic organic acids.

16. The method of claim 13 wherein oxygen is introduced to the reaction system in order to maintain the metal ion in an oxidation state suitable for decarboxylation.

17. The method of claim 16 wherein oxygen gas is dissolved into a liquid phase of the reaction system.

18. The method of claim 16 wherein oxygen gas is introduced to a gaseous phase of the reaction system.

19. The method of claim 11 wherein oxygen is generated in-situ in the reaction system.

20. The method of claim 19 wherein an organic dye sensitizer is synthesized in situ within the zeolite structure.

21. The method of claim 1 wherein the photoassisting species comprises an organic dye sensitizer.

22. The method of claim 1 wherein said photoassisting species is incorporated within the framework of said zeolite catalyst.

* * * * *